May 26, 1953 R. S. ZEBARTH 2,639,463
RIGID TYPE SHACKLE FOR HANGING POULTRY
Filed May 21, 1951

INVENTOR.
Ralph S. Zebarth
BY
ATTORNEY.

Patented May 26, 1953

2,639,463

UNITED STATES PATENT OFFICE 2,639,463

RIGID TYPE SHACKLE FOR HANGING POULTRY

Ralph S. Zebarth, Hickman Mills, Mo., assignor to Gordon Johnson Company, Kansas City, Mo., a corporation of Missouri Application May 21, 1951, Serial No. 227,479

9 Claims. (Cl. 17—44.1)

This invention relates broadly to equipment for handling and dressing of poultry and more particularly to a shackle adapted to receive a bird and to hold the same positively against displacement during at least certain of the dressing steps, the primary object being to provide a shackle that is light in weight, inexpensive to manufacture and easily placed in use.

It is the most important object of the present invention to provide a light-weight, wire-like shackle for poultry that includes structure forming a plurality of side-by-side notches or spaces for receiving the legs of the fowl, the dimensions of the spaces differing whereby a single shackle may accommodate birds of differing sizes.

Another important object of this invention is to provide a poultry shackle that includes two sets of spaced-apart, upright fingers presenting leg-receiving spaces therebetween of differing widths and differing lengths to the end that poultry of differing sizes may be accommodated by the shackle and to facilitate the placement of the legs in the shackle by the operator.

A further object of this invention is to provide a poultry shackle wherein the aforesaid fingers of differing lengths are so formed and disposed to present guides, thereby making it possible for the operator to place the poultry legs in the desired slots or spaces, quickly and with relative ease.

Other objects include the way in which the poultry shackle hereof is made from but a few stretches of wire-like material; the way in which the various parts are interconnected to present a rigid assembly; and many more minor objects including details of construction, all of which will be made clear or become apparent as the following specification progresses, reference being had to the accompanying drawing, wherein.

Figure 1:
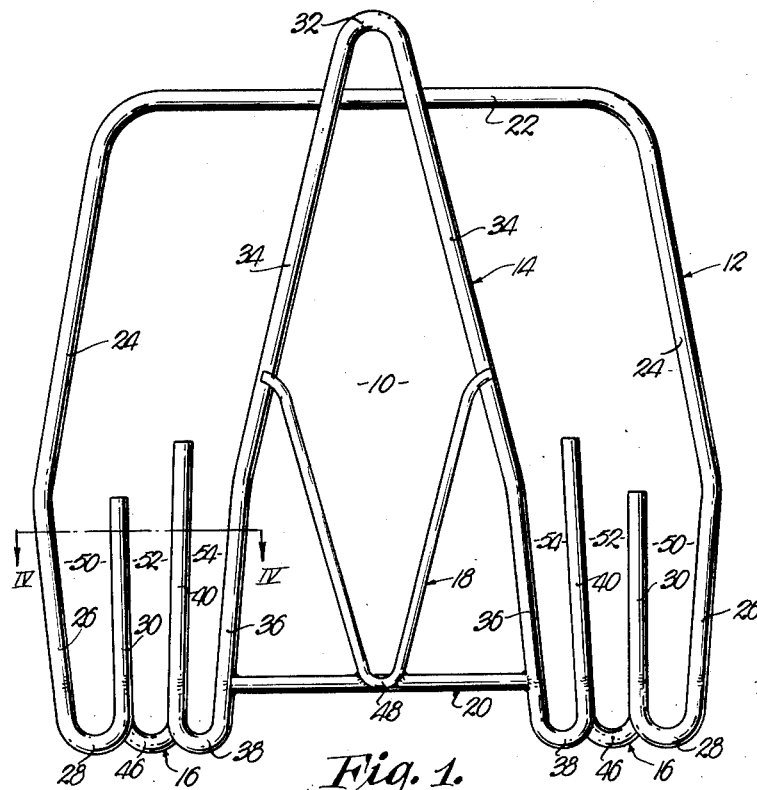
Fig. 1 is an elevational view of a rigid-type shackle for hanging poultry made pursuant to the present invention.

The form of the poultry shackle of the present invention illustrated in Figs. 1 to 4 inclusive of the drawing, is broadly designated by the numeral 10 and is made in its entirety from separate lengths of wire-like material designated by the numerals 12, 14, 16, 18 and 20.

The portions 12 and 14 of the shackle 10, comprise the main frame-like body portions thereof, the former being bent and shaped to present a straight bight 22 adjacent the upper end of shackle 10, a pair of straight legs 24 that converge as the bight 22 is approached; a second pair of shorter legs 26 angularly displaced with respect to the legs 24 and converging as the point of merger with the legs 24 is approached; an arcuate, re-bent portion 28 at the lowermost ends of the legs 26 and an upright, straight finger 30 that converges slightly with the legs 26 as the arcuate portions 28 are approached.

The portion or section 14 of shackle 10 is re-bent upon itself to present a bight 32 forming the apex of a V-shaped construction that includes a pair of legs 34 that converge as bight 32 is approached. Section 14 includes additionally, a pair of shorter legs 36 that are angularly displaced relative to legs 34 and converge therewith as the point of merger between legs 34 and 36 is approached. Legs 36 terminate at the lowermost ends thereof in a re-bent or arcuate portion 38 which in turn are provided with up-standing fingers 40 that converge slightly with the legs 36 as the arcuate portion 38 is approached.

There are two sections 16 forming a part of the shackle 10, each being U-shaped, presenting a pair of legs 42 and 44 and an arcuate bight 46. The legs 42 and 44 are co-extensive in length with the corresponding fingers 30 and 40 to which they are affixed in any suitable manner such as by welding, it being noted that the four arcuate portions 28 and 30, as well as the bights 46, all terminate at the lowermost extremities of the shackle 10 in substantially the same plane. The legs 42 and 44 and accordingly, the fingers 30 and 40 to which they are affixed, converge slightly as the bight 46 is approached.

The shackle section 20 includes a single, elongated bar that joins the legs 36 of section 14 adjacent the lowermost ends thereof. The shackle section 18 is substantially V-shaped presenting a bight 48 that is welded or otherwise affixed directly to the bar 20 intermediate the ends of the latter. The upwardly diverging legs of the V-shaped section 18 join at their free ends directly with the legs 34 of shackle section 14 as is clear in Fig. 1 of the drawing.

Figure 3:
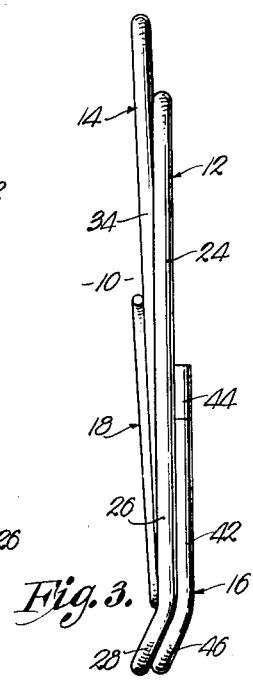
Fig. 3 is an edge elevational view.
Figure 2:
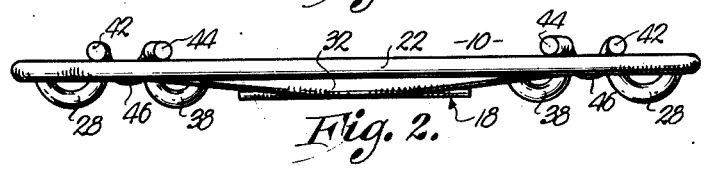
Fig. 2 is a top plan view thereof.
Figure 4:
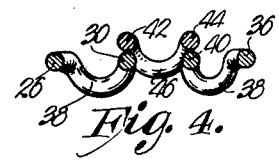
Fig. 4 is a fragmentary, transverse, cross-sectional view taken on line IV—IV of Fig. 1, looking in the direction of the arrows.

All of the aforesaid parts of shackle 10 are in substantially the same plane except that the legs 34 overlap bight 22 adjacent the uppermost ends of the former as shown in Fig. 3, and the bracing means 18 overlaps the legs 34 and the bar 20. Additionally, as illustrated in Fig. 3 of the drawing, all of the arcuate ends 28, 38 and 46 are laterally offset below an extended line through the longitudinal axis of the elongated bar 20.

While the legs 26 and 36 are substantially co-extensive in length with the fingers 30 and accordingly with the legs 42, the fingers 40 and accordingly the legs 44, are longer than the fingers 30 as is clear in Fig. 1 of the drawing. The width of the space 50 between legs 26 and the corresponding finger 30 is greater than the width of space 52 between fingers 30 and 40 and the width of the space 52 is greater than the width of space 54 between fingers 40 and the corresponding legs 36.

It is now seen that there is provided in shackle 10, two sets of legs or fingers 26, 30, 40 and 36 presenting two sets of spaces 50, 52 and 54. When the shackle 10 is placed in use, each set is adapted to receive one leg of a fowl to be suspended thereby and the operator may selectively use either the pair of spaces 50, the pair of spaces 52, or the pair of spaces 54 depending upon the size of the bird to be placed thereon. It is a simple matter to attach the legs to the shackle 10 in any space desired because of the fact that the aforesaid legs and fingers all serve as guides to aid in the proper positioning of the legs of the bird as desired without delay. In the event that the operator desires to place such legs in the two spaces 50, the inclined legs 24 of section 12, guide the legs of the bird downwardly until the same are within the spaces 50 and in engagement with the laterally offset arcuate portions 28 closing the lowermost ends of spaces 50. If a smaller bird is to be placed on the shackle 10, the legs thereof are grasped, extended into the frame portion 12 at that side thereof opposite to brace 18 and guided along the inner faces of inclined legs 24 to a point just above the legs 26. The operator thereupon shifts the legs of the bird laterally or together, clearing the uppermost ends of the fingers 30 and until the legs come into engagement with the upper ends of fingers 40. Such legs of the bird are thereby aligned for downward movement and positioning within the spaces 52 to a point where they bear against the two bights 46 of shackle sections 16.

In the event that a still smaller bird is to be placed upon the shackle 10, the legs are likewise extended through shackle section 12 between legs 24 and 34 and brought into engagement with the inclined legs 34 of section 14. The legs of the bird may thereupon be shifted downwardly and in sliding engagement with legs 34 and 36 until such legs are within the spaces 54 and in engagement with the arcuate portion 38.

All of these operations are manifestly rendered easy because of the guiding that is presented by the shackle 10 and it is seen that by virtue of the offsetting of the arcuate, closed ends of the spaces 50, 52 and 54, the bird will hang substantially vertically directly below the shackle 10 with the feet on that side or face of the shackle 10 illustrated in Fig. 1 of the drawing.

Figure 5:
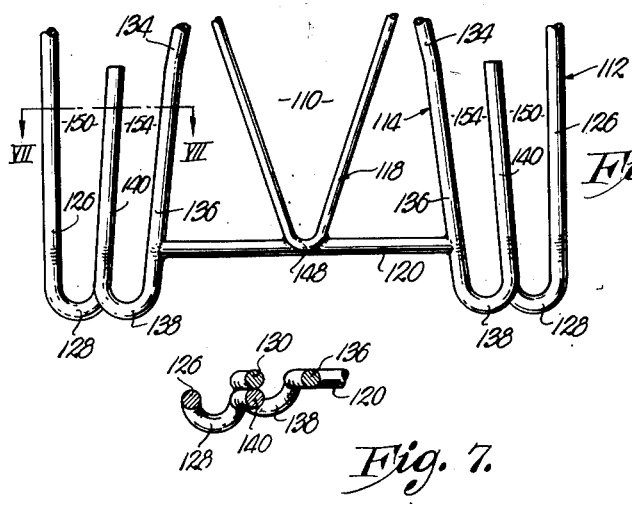
Fig. 5 is a fragmentary, elevational view of a slightly modified form of poultry shackle embodying the present invention.
Figure 6:
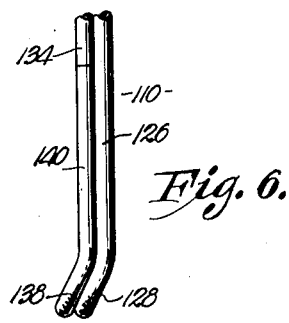
Fig. 6 is an edge elevational view of the shackle shown in Fig. 5.
Figure 7:
Fig. 7 is a detailed, transverse, cross-sectional view taken on line VII—VII of Fig. 5.

The form of the present invention shown in Figs. 5 to 7 inclusive, is substantially the same as shackle 10 with the exception only of omitting the two sections 16 thereof and accordingly, presenting but two leg-receiving spaces in each of the pair of sets thereof.

Accordingly, the various parts of shackle 110 in Figs. 5 to 7 inclusive, are designated in correspondence with the designations of Figs. 1 to 4 inclusive except in the 100 series. By virtue of the omission of the section 16 in shackle 110, the fingers 140 of the section 114 are of the same length and joined directly to the fingers 130 of the section 112 in overlapping relationship thereto.

It is clear that shackle 110 is placed in use in substantially the same way as above described relative to shackle 10 and it is incidentally notable that shackles of this character are normally suspended from a suitable support, the bight portion 32 of shackle 10 presenting a loop for receiving such support and the shackle 110 obviously being provided with the same construction. Such support may constitute a continuous track, a rotatable element or other assembly as may be desired.

It is now apparent that the objects and advantageous features of the present invention as initially set forth herein are fulfilled through manufacture and use of either of the two embodiments chosen for illustration and while details of construction may be changed, it is desired to be limited only by the spirit of the invention as set forth in the appended claims.

Having thus described the invention what is claimed as new and desired to be secured by Letters Patent is:

1. A poultry shackle comprising a frame having a pair of spaced sets of elongated fingers, there being more than two upright, substantially parallel fingers in each set thereof and disposed to present a plurality of leg-receiving spaces; and means joining the fingers for closing the spaces at the lowermost ends thereof.

2. A poultry shackle comprising a frame having a pair of spaced sets of elongated fingers, there being more than two upright, substantially parallel fingers of varying lengths in each set thereof and disposed to present a plurality of leg-receiving spaces; and means joining the fingers for closing the spaces at the lowermost ends thereof.

3. A poultry shackle comprising a frame having a pair of spaced sets of elongated fingers, there being more than two upright, substantially parallel fingers in each set thereof and disposed to present a plurality of elongated leg-receiving spaces of varying widths; and means joining the fingers for closing the spaces at the lowermost ends thereof.

4. A poultry shackle comprising a frame having a pair of spaced sets of elongated fingers, there being more than two upright, substantially parallel fingers of varying lengths in each set thereof and disposed to present a plurality of elongated leg-receiving spaces of varying widths; and means joining the fingers for closing the spaces at the lowermost ends thereof.

5. A poultry shackle comprising a frame having a pair of spaced sets of elongated fingers disposed in substantially the same plane, there being more than two upright, substantially parallel fingers in each set thereof and disposed to present a plurality of leg-receiving spaces; and means joining the fingers and extending laterally from said plane for closing the spaces at the lowermost ends thereof.

6. A poultry shackle comprising a frame having a pair of spaced sets of elongated fingers, there being more than two fingers in each set including a pair of spaced, relatively long fingers and at least one shorter finger between the long fingers; and means joining the fingers at one end thereof, presenting a number of leg-receiving spaces open at the opposite end of the fingers.

7. A poultry shackle comprising a frame having a pair of spaced sets of elongated fingers, there being more than two fingers in each set including a pair of spaced, relatively long fingers and a number of spaced, shorter fingers between the long fingers; and means joining the fingers at one end thereof, presenting a number of leg-receiving spaces open at the opposite end of the fingers, the lengths of the shorter fingers progressively increasing as one of the long fingers is approached.

8. A poultry shackle comprising a frame having a pair of spaced sets of elongated fingers, there being more than two upright, substantially parallel fingers in each set thereof and disposed to present a plurality of leg-receiving spaces; and means joining the fingers for closing the spaces at the lowermost ends thereof, the distance between the fingers progressively decreasing as the innermost finger of each set is approached.

9. A poultry shackle comprising a frame having a pair of spaced sets of spaced, elongated, upright, substantially parallel fingers disposed in substantially the same plane, there being more than two fingers in each set thereof, one of the fingers of each of said sets forming an outer side of the frame, and there being in each of said sets a number of relatively short fingers disposed to present a plurality of leg-receiving spaces, the lengths of the relatively short fingers of each set progressively decreasing as the outer sides of the frame respectively are approached, the spacing between the fingers of each set progressively increasing as the said outer sides respectively are approached; and means joining the fingers of each set respectively for closing said spaces at the lowermost ends thereof, said means extending at an angle from said plane, whereby to receive the spread legs of poultry of various sizes and to hold the same in condition for the removal of feathers.

RALPH S. ZEBARTH.

References Cited in the file of this patent

UNITED STATES PATENTS

| Number | Name | Date |
|---|---|---|
| 747,606 | Hildebrandt | Dec. 22, 1903 |
| 846,674 | Lamb | Mar. 12, 1907 |
| 1,177,188 | Keller | Mar. 28, 1916 |
| 1,638,945 | London | Aug. 16, 1927 |